United States Patent [19]

Bain

[11] 4,278,875
[45] Jul. 14, 1981

[54] ELECTRICALLY HEATED WINDOW

[75] Inventor: Peter H. Bain, Renton, Wash.

[73] Assignee: The Boeing Company, Seattle, Wash.

[21] Appl. No.: 105,389

[22] Filed: Dec. 19, 1979

[51] Int. Cl.$^3$ ............................................. H05B 3/06
[52] U.S. Cl. ................................. 219/522; 219/203;
219/541; 219/543; 219/544; 338/309; 428/38;
428/901; 219/547
[58] Field of Search ............... 219/203, 345, 522, 541,
219/543, 544, 547; 428/38, 433, 901; 338/308,
309

[56] References Cited

U.S. PATENT DOCUMENTS

| | | | |
|---|---|---|---|
| 1,187,346 | 6/1916 | Lea | 65/43 X |
| 2,497,507 | 2/1950 | McMaster | 219/522 |
| 2,640,904 | 6/1953 | Gaiser | 219/203 X |
| 2,773,162 | 12/1956 | Christensen | 219/203 X |
| 2,813,960 | 11/1957 | Egle et al. | 219/522 X |
| 2,866,881 | 12/1958 | McMillen | 219/522 |
| 3,041,436 | 6/1962 | Brady | 219/203 |
| 3,349,722 | 10/1967 | Davis | 219/543 X |
| 3,356,833 | 12/1967 | Orcutt | 219/522 |
| 3,524,920 | 8/1970 | Stromquist et al. | 219/203 X |
| 3,974,359 | 8/1976 | Orcutt et al. | 219/522 |

*Primary Examiner*—Volodymyr Y. Mayewsky
*Attorney, Agent, or Firm*—Christensen, O'Connor, Johnson & Kindness

[57] ABSTRACT

An electrically heatable window pane suitable for use in an anti-icing capacity in an aircraft windshield includes a substantially transparent layer of an electroconductive material, preferably tin oxide, sandwiched between fused sheets of glass. The sheets of glass and the layer of electroconductive material are fused together to form a structurally unitary window pane which is heatable by applying an electric potential to the electroconductive layer. Such a heatable window pane may be laminated to a structural fail-safe glass ply in a conventional manner to form a preferred embodiment of an aircraft windshield. In an alternative embodiment, an airplane windshield is formed with two independent electroconductive layers adjacent the inner and outer surfaces of the windshield to provide anti-icing capability on the outside surface and defogging capability on the inside surface.

9 Claims, 4 Drawing Figures

U.S. Patent    Jul. 14, 1981    4,278,875
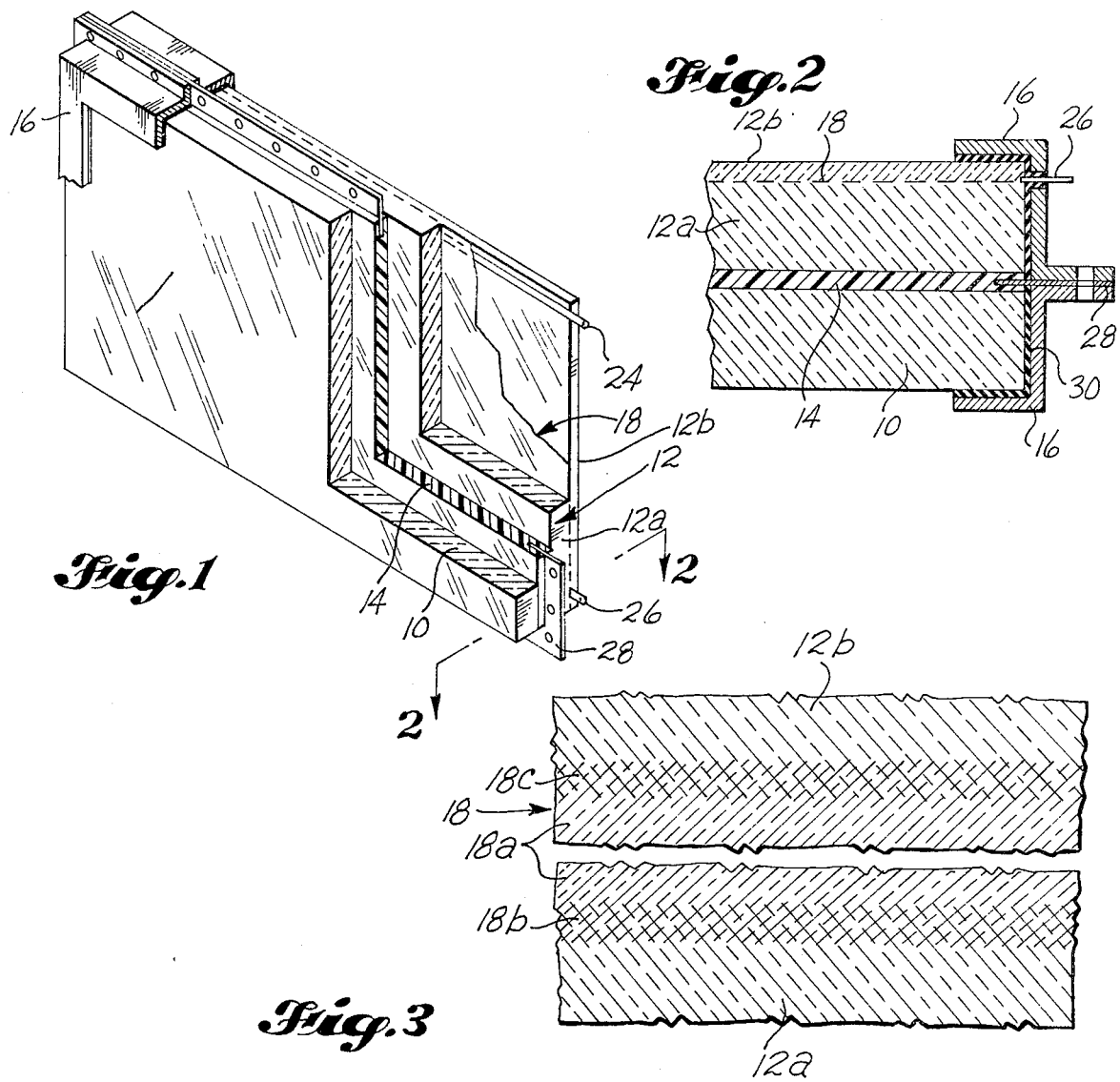
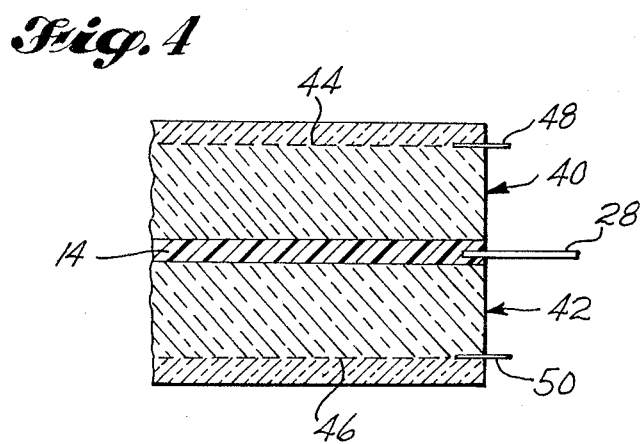

ELECTRICALLY HEATED WINDOW

BACKGROUND OF THE INVENTION

The present invention relates to electrically heated windows, and more particularly to electrically heated windshields for aircraft.

Windshields for commercial aircraft are generally laminated structures formed of several layers of tempered glass and polymeric binding materials. Typically, a laminated aircraft windshield includes an outer glass face ply that is electrically heatable to prevent the accumulation of ice thereon. The outer glass face ply is laminated to a thicker, inner glass ply referred to as a main structural ply or pressure pane. Sometimes an additional structural ply, known as a fail-safe pane, is provided. The glass plies are typically bonded together with a clear polymeric sheet known as an interlayer. In addition to binding the glass plies together, the interlayer provides a flexible membrane to contain internal cabin pressure in the unlikely event of a complete glass pane failure.

In one type of heated aircraft windshield known in the industry, an electrical heating element consists of a thin layer of a transparent electroconductive material fused to the inner surface of the glass face ply. The face ply is bonded to a main structural glass ply by a polymeric interlayer as described above. The layer of electroconductive material is thus fused to the glass face ply on one side and adhered to the interlayer on the opposite side. The glass face ply is heated by passing an electric current across the windshield through the electroconductive layer. Electrical contact with the electroconductive layer is typically made with a pair of bus bars inserted between the glass face ply and the interlayer along opposite sides of the windshield. One advantage of such a windshield is that heat may be generated as a result of the electrical resistance of the electroconductive coating to maintain the temperature of the outer surface sufficiently high to prevent formation of ice or frost. Also, the absence of wire or other types of opaque heating elements embedded in the windshield improves the optical quality of the windshield.

Despite the advantages of the above-described windshield, certain disadvantages have been recognized. For example, the wide temperature range to which aircraft windshields are exposed during normal flight operations results in differential expansion of the polymeric interlayer and the glass plies. The interlayer has a higher coefficient of thermal expansion than that of either the glass face ply or the glass structural ply. Hence, the interlayer tends to expand and contract to a greater extent than the glass plies during temperature fluctuations, thereby resulting in substantial shear stresses being imposed on the bond between the glass plies. It has been observed that such shear stresses imposed by temperature fluctuations are particularly pronounced at the margins of the windshield. Additionally, various orthogonal stresses are imposed on the glass plies and the interlayer by the pressure differential between the pressurized aircraft cabin and the reduced pressure of the outside atmosphere. The various stresses imposed by thermal fluctuations and pressure differentials lead to three principal modes of failure of such windshields. First, bond failure, or delamination, occasionally occurs btween the glass plies and the interlayer. This results in deterioration of the optical quality of the windshield and also occasionally results in disruption and failure of portions of the electroconductive heating element.

Secondly, a phenomenon known in the industry as "cold chipping" is occasionally observed along the margins of the windshield where shear stresses are most pronounced. Cold chipping occurs when the interlayer thermally contracts due to cold temperatures and pulls chips of glass inwardly away from the edges of the outer glass face ply. Occasionally, these chips are deep enough to penetrate that portion of the glass that is subject to locked-in tension stresses caused by tempering, resulting in complete fracturing of the face ply.

Thirdly, a condition also due to the thermal contraction and stiffening of the interlayer is known as interlayer or vinyl cracking. This occurs when the resulting high stresses are not relieved by delamination or cold chipping, and is essentially a tensile or cohesive failure of the interlayer. This results in a loss of the ability to carry fail-safe pressure loads in the event of glass failure.

It is also recognized that the deterioration of aircraft windshields in the manner described above may be aggravated and accelerated by exposure of the polymeric resin constituting the interlayer to ultraviolet radiation and moisture, particularly around the edges of the windshield. Such exposure may cause the interlayer resin to deteriorate and become relatively hard and brittle. The brittle resin is thus less plastic and causes greater stresses to be applied to the bond line, the glass plies and the interlayer itself upon thermal contraction and expansion of the resin.

Yet another problem with conventional electrically heated windshields is the occasional fracturing of the outer face ply by hail. This occurs because the face ply must be kept sufficiently thin so that the electroconductive heating element may be positioned sufficiently close to the outer exposed surface to provide effective anti-icing capabilities. The strength of a glass ply may be increased by a thermal or chemical process known as tempering. The increase in strength that is obtainable is proportional to the thickness of the ply and has a marked effect on the fracture characteristics and residual visibility through the windshield in the event of impact damage. To ensure sufficient residual visibility, face plies are usually only partially tempered. As a result, and also because of the reduced thickness demanded by thermal requirements, face plies are not as strong as would be desired to effectively withstand all hail conditions.

Accordingly, it is a general object of the present invention to provide an improved electrically heated window suitable for use as an aircraft windshield. Specifically, it is an object of the present invention to provide an electrically heated aircraft windshield having a heatable main glass ply of unitary construction. It is also an object of the present invention to reduce the use of interlayers in electrically heated aircraft windshields. Finally, it is yet another object of the present invention to provide a heatable aircraft windshield that can be fabricated with a greater degree of strength for increased impact and abrasion resistance and improved durability.

SUMMARY OF THE INVENTION

In accordance with the present invention, an electrically heatable window pane is constructed having a transparent electroconductive layer, preferably tin oxide, sandwiched between an outer glass face sheet and an inner glass structural sheet. The electroconductive layer and the glass sheets are fused together to form a structurally unitary, single window pane.

The heatable pane is formed from a glass face sheet and a glss structural sheet. A layer of the electroconductive material is first deposited on one side of either the face sheet or the structural sheet. This is typically accomplished by heating the sheet to a temperature sufficiently high to soften the surface of the glass but not so high as to thoroughly melt the glass. The electroconductive material is then sputtered or sprayed onto the soft surface of the hot glass sheet. The electroconductive materal is deposited as a thin, discrete layer that is firmly fused and bonded to the glass sheet on cooling. The boundary between the deposited layer of electroconductive material and the underlying glass sheet is not distinct, but rather is of the nature of a diffused interface wherein glass and the electroconductive material are diffused and intermixed at the molecular level.

The second glass sheet is subsequently heated and pressed against the electroconductive layer on the hot, coated glass sheet. The two glass sheets are thereby fused together in a manner similar to the bond between the electroconductive layer and the first glass sheet, and with similar diffusion of the electroconductive material with the surface regions of each glass sheet. Thus is formed a structurally unitary glass pane having an electroconductive layer integrally incorporated therein that is suitable for providing anti-icing capability. The entire glass window pane may then be tempered to the required strength. The glass pane may further be bonded to an additional fail-safe ply in a conventional manner with a polymeric interlayer to form a complete windshield.

BRIEF DESCRIPTION OF THE DRAWINGS

FIG. 1 is a pictorial view in partial cross section of the preferred embodiment of an aircraft windshield constructed in accordance with the present invention.

FIG. 2 is a cross section of the aircraft windshield of FIG. 1 taken along line 2—2 of FIG. 1.

FIG. 3 is a magnified schematic cross section of the electroconductive layer 18 and adjacent glass layers of the heatable pane 12 of FIG. 2.

FIG. 4 is a cross section of an aircraft windshield constructed in accordance with an alternative embodiment of the present invention.

DESCRIPTION OF THE PREFERRED EMBODIMENT

FIGS. 1 and 2 illustrate the preferred embodiment of an aircraft windshield having anti-icing capability and constructed in accordance with the present invention. Briefly, the windshield includes an inner fail-safe glass ply 10 bonded to an outer, electrically heatable face ply 12 by an interlayer 14 composed of a suitable polymeric resin. The two plies 10 and 12 and their interlayer 14 are mounted in a suitable peripheral frame 16 which may be secured to a windshield opening in an aircraft fuselage.

The present invention is embodied in the heatable glass face ply 12, wherein a transparent electroconductive layer of tin oxide 18 is integrally incorporated in the face ply 12. The heatable ply 12 is a structurally unitary glass pane formed originally from two glass sheets; a relatively thick structural glass sheet, incorporated into the heatable ply 12 as a relatively thick, inner glass sheet 12a, and a relatively thin glass sheet incorporated into the heatable ply 12 as an outer, relatively thin glass sheet 12b (FIGS. 2 and 3). The inner glass sheet 12a is on the order of 0.50 to 0.75 inches thick and serves primarily to provide strength and support for the heatable ply 12. The outer sheet 12b is on the order of 0.10 to 0.20 inches thick and serves to protect the layer 18 of tin oxide and provide a hard glass surface over the exposed surface area of the windshield. The outer glass sheet 12b must be sufficiently thin that its exposed outer surface 12c can be heated to a temperature sufficient for anti-icing purposes.

Referring to FIG. 3, the electroconductive layer 18 of tin oxide sandwiched between the glass sheets 12a and 12b of the heatable face ply 12 is on the order of a few Angstroms thick. The tin oxide layer 18 includes a central region 18a that has the greatest concentration of tin oxide. On opposite sides of the central region 18a, the tin oxide grades into the glass of sheets 12a and 12b over diffused boundary interfaces 18b and 18c, respectively. Within the diffused boundary interfaces 18b and 18c, the tin oxide is intimately intermixed with the glass of sheets 12a and 12b, respectively. A smooth concentration gradient exists within each of the diffused boundary interfaces 18a and 18c, with the relative concentration of tin oxide decreasing progressively away from the central region 18a of greatest concentration of tin oxide. Conversely, the relative concentration of glass within the diffused boundary interfaces 18b and 18c progressively increases away from the central region 18a of greatest concentration of tin oxide. The diffused interfaces 18b and 18c serve to securely bond the glass sheets 12a and 12b together to thereby form the structurally unitary heatable glass ply 12.

The heatable glass ply 12 is formed in two steps. In the first step, a relatively thin glass sheet that is to become the outer glass sheet 12b is heated to a temperature sufficiently high to soften the surface of the glass but not so high as to thoroughly melt the glass, typically on the order of 1200° F. The tin oxide is then sputtered onto the hot surface of the glass sheet by an electrode sputtering process well known in the art. When sputtered on to the glass in such a manner, the tin oxide combines with the glass surface to form a layer of tin oxide which subsequently becomes the central region 18a of highest concentration of tin oxide and also partially mixes with the underlying glass to form the diffused boundary interface 18b. In the second step, a relatively thick glass sheet is fused and bonded to the sputtered tin oxide surface on the relatively thin glass sheet. This involves placing the two sheets into contact under pressure and heating them to the fusing temperature of the glass. The two glass sheets thereby become fused together, enclosing the sputtered layer of tin oxide 18 to give the structurally unitary heatable ply 12. After fusing, the heatable ply 12 is subjected to a controlled cooling cycle to achieve the desired degree of temper in the glass.

Other suitable electroconductive materials that may be substituted for the tin oxide of the preferred embodiment include indium oxide, gold and silver. Other metallic and metallic oxide materials may also be employed. The method of application of the electroconductive material to a first glass sheet may also be varied according to techniques well known in the industry. For example, an aqueous solution of a metallic oxide may be sprayed onto the hot, tacky glass surface to result in evaporation of the aqueous solvent and uniform distribution of the metallic oxide over the surface of the glass.

During the compression and fusion bonding of the glass sheets to form the heatable face ply 12, a pair of electrical bus bars 24 and 26 are embedded in contact with the electroconductive layer 18 between the inner and outer glass sheets 12a and 12b. The electrical bus bars may be of any suitable conductive material, for example copper. The bus bars 24 and 26 are generally positioned along opposite sides of the window ply and extend at their ends from the edges of the windshield unit in order to provide electrical contacts for the heatable ply 12.

The heatable ply 12 is bonded to the fail-safe ply 10 in a conventional manner by the interlayer 14 of polymeric resin. A retention strap 28 is typically embedded in the peripheral portions of the interlayer 14 to provide for its fail-safe retention in the event of glass failure. Fabrication of the windshield unit is completed by installation of the frame 16. An elastomer seal 30 is customarily installed between the glass plies 10 and 12 and the interior surfaces of the frame 16.

In an alternative embodiment, illustrated in FIG. 4, a windshield unit includes interior and exterior heatable plies 40 and 42, each having incorporated therein an electroconductive layer of tin oxide 44 and 46, respectively. The heatable plies 40 and 42 are each constructed in essentially the same manner as described above for the heatable ply 12. Electrical bus bars 48 and 50 provide electrical contacts with the layers 44 and 46, respectively. Corresponding bus bars on the opposite side of the windshield (not shown) complete the electrical circuits. The windshield unit illustrated in FIG. 4 thus has an exterior surface with anti-icing capability and an interior surface with defogging capability. Moreover, the anti-icing and defogging layers 44 and 46 may be actuated independently.

As an alternative to resistive heating of the window, dielectric heating may be employed with the present invention by application of a high frequency potential to a pair of spaced electroconductive layers lying in different planes, or to interdigitated portions of a pair of electroconductive layers lying in the same plane, to heat the glass by stray field dielectric losses.

Although the present invention is described herein by reference to a preferred embodiment and an alternative embodiment, it is understood that various alterations, substitutions and modifications which may be apparent to one skilled in the art may be made without departing from the essential spirit of the invention. Accordingly, the scope of the present invention is defined by the following claims.

The embodiments of the invention in which an exclusive property or privilege is claimed are defined as follows:

1. A transparent window comprising a structurally unitary, electrically heatable window pane, said window pane having a substantially transparent layer of an electroconductive material sandwiched between and fused directly to first and second sheets of glass fused directly together, and means forming an electrical contact with said layer of electroconductive material for applying an electrical potential to said layer.

2. The window defined in claim 1 wherein said electroconductive material consists essentially of tin oxide.

3. The window defined in claim 2 wherein said first sheet of glass is of a greater thickness than said second sheet of glass to thereby cause heat generated at said layer of tin oxide to be selectively conducted to the outer surface of said second sheet of glass.

4. A laminated, electrically heatable windshield comprising a fail-safe glss ply bonded to a structurally unitary, heatable glass face ply by a polymeric interlayer, said heatable glass face ply including exterior and interior sheets of glass and a substantially transparent layer of an electroconductive material sandwiched therebetween, said exterior and interior sheets of glass being fused directly together to integrally enclose said layer of electroconductive material, said exterior sheet of glass forming the outer surface of said windshield, and means for application of an electric potential to said layer of electroconductive material.

5. The windshield defined in claim 4 wherein said electroconductive material consists essentially of tin oxide.

6. The windshield defined in claim 5 wherein said interior sheet of glass of said heatable face ply is of a greater thickness than said exterior sheet of glass to thereby cause heat generated in said layer of tin oxide to be selectively conducted through said exterior sheet of glass to provide anti-icing capability over said outer surface of said windshield.

7. A laminated, electrically heatable windshield comprising inner and outer heatable glass plies bonded together by an intermediate polymeric interlayer, said inner and outer heatable glass plies each including first and second sheets of glass and a substantially transparent layer of an electroconductive material sandwiched therebetween, said first and second sheets of glass of each heatable ply being fused directly together to integrally enclose therebetween said layer of electroconductive material and thereby form a structurally unitary heatable ply, and means for selectively applying an electric potential across said layers of electroconductive material of said inner and outer heatable plies.

8. The windshield defined in claim 7 wherein said electroconductive material consists essentially of tin oxide.

9. The windshield defined in claim 8 wherein said first sheets of glass of said inner and outer heatable plies are bonded together by said polymeric interlayer and wherein said first sheets are of a thickness greater than said second sheets such that heat generated at said layers of tin oxide of said inner and outer heatable plies is selectively conducted to the inner and outer surfaces of said windshield, respectively.

* * * * *